United States Patent Office 3,228,978
Patented Jan. 11, 1966

3,228,978
PRODUCTION OF PERACETIC ACID
Werner Lohringer and Johann Sixt, Munich, Germany, assignors to Wacker-Chemie G.m.b.H., Munich, Germany
No Drawing. Filed Aug. 14, 1961, Ser. No. 131,102
Claims priority, application Germany, Aug. 22, 1960, W 28,418
4 Claims. (Cl. 260—502)

The present invention relates to an improved process for the production of peracetic acid from acetaldehyde and oxygen.

It is known that peracetic acid containing oxidation mixtures can be obtained by oxidation of acetaldehyde diluted with a solvent with oxygen or oxygen containing gases in the presence of small quantities of salts of heavy metals, such as iron, nickel, cobalt, copper and the like, at temperatures between −10 to +60° C. A per-adduct is also formed in a secondary reaction during the oxidation reaction from the peracid and acetaldehyde, even at higher temperatures, which react further to produce acetic acid or respectively acetic acid anhydride and water. This adduct formation evidently causes the formation of acetic acid and other by-products at higher temperatures and after longer reaction periods and causes the unsatisfactory yields of the peracid which are obtained.

It is also known that high yields of peracetic acid can be obtained by oxidation of acetaldehyde by first forming a per-adduct (acetaldehyde monoperacetate) from acetaldehyde and oxygen at low temperatures and cleaving such adduct in a second step and then isolating the peracetic acid.

According to the invention, it was found, that despite the complex relationships between the primary production and decomposition of the peracetic acid, its rate of formation and its reaction with acetaldehyde with the formation of the per-adduct or respectively acetic acid and other decomposition products, that a considerably more favorable process for the production of peracetic acid from acetaldehyde at given catalyst concentrations, temperature and pressure conditions can be provided if the following measures are employed.

Only about 50% of the acetaldehyde provided which is diluted with a solvent is oxidized in the presence of small quantities of catalyst, preferably cobalt salts. It was observed that in the process according to the invention practically all of the oxygen taken up, up to this degree of conversion, is used for the formation of peracetic acid and that only traces of acetic acid are produced. If the oxidation is continued beyond this point the yield of peracetic acid which reference to acetalaldehyde converted drops. The unconverted acetaldehyde is then immediately distilled off under vacuum so that it cannot subsequently react with the peracetic acid produced. Reduced pressures of 50–350 mm. Hg (absolute) depending upon the solvent used have proved advantageous. The catalyst is made as inactive as possible before starting the distillation in a known manner by the addition of stabilizing agents as the metal salts reduce the stability of the peracid. Ion exchangers can also be employed to remove the deleterious effect of the catalyst, for example, by passing the reaction mixture through a layer of ion exchange material. Of course, a combination of both means could be employed.

The advantage of proceeding in the manner described is a substantial increase in space-time yield. It also was found that the peracetic acid is formed in good yield up to the above specified 50% conversion and that the oxygen is taken up rapidly. The result is that the quantity of peracetic acid produced per unit of time with the other conditions such as acetaldehyde and catalyst concentration, pressure and temperature being the same is about 4–6 times as large as upon oxidation beyond the 50% conversion of the acetaldehyde provided, or upon oxidation until substantially complete oxidation of the acetaldehyde.

In contrast to the process of producing peracetic acid from the per-adduct, the process according to the invention among other advantages has the advantage that the production of the extraordinarily unstable and explosive intermediate product is substantially avoided, that in view of operating at temperatures above 10° C. the heat of oxidation is easily removed with ordinary tap water rather than with brine and also that the velocity of the oxidation is many times faster than in such other process. In the process according to the invention yields of up to 95% based on the acetaldehyde converted in the oxidation apparatus can be achieved.

Stable peracetic acid is recovered from the unstable peracetic acid acetaldehyde product by the subsequent distillation. Only very small losses of active oxygen occur during such distillation and peracetic acid can also be formed from the small quantities of per-adduct which is also produced by splitting off the acetaldehyde. The final yield of peracetic acid therefore is only inconsequentially below the total quantity of per compound in the oxidation liquid.

The process according to the invention, for example, can be carried out as follows:

A solution of acetaldehyde in ethyl acetate or acetone containing 10–30 g. of acetaldehyde per 100 g. of solution is expediently employed as the liquid to be oxidized. The oxygen can be supplied to such liquid at atmospheric pressure or several atmospheres gauge pressure at temperatures of about 15–50° C., preferably 20–35° C. At an acetaldehyde concentration of about 30%, it is advantageous to employ a moderate superatmospheric pressure so that the vapor pressure of acetaldehyde causes no difficulties. The oxidation advantageously is continuous. Among others, polyphosphates, ethylene diamine tetraacetic acid, hydroxy quinoline have proved suitable as stabilizers for the oxidized liquid. It is expedient to cool the solutions leaving the oxidation apparatus on their way to the distillation column to avoid the production of undesired acetic acid as much as possible. The distillation column is operated in such a manner that the oxidized liquid is introduced into the upper third thereof. The ethyl acetate or respectively the acetone is evaporated by a heating coil located in the sump of the column and the vapors passed countercurrently to the peracetic acid solution. By providing a reflux condenser a portion of the vapors can be condensed and returned to the column as reflux. The acetaldehyde which has been separated off in the other portion is recovered and stored for reuse in a further oxidation. The peracetic acid ester mixture taken out of the sump contains the peracetic acid in stable form but if desired it can be treated with an ion exchanger for further purification. A purification of the oxidized liquid with ion exchangers before the distillation has also proved advantageous.

The process according to the invention renders it possible easily to produce concentrated peracetic acid such as is employed for epoxidation.

The following examples will serve to illustrate several embodiments of the process according to the invention and its advantages over the previously employed procedures.

*Example 1*

16 g. of acetaldehyde were mixed with 180 cc. of ethyl acetate containing 0.0012 g. of cobalt acetate and heated with molecular oxygen at atmospheric pressure at 35° C. in a shaking apparatus (the temperature being maintained constant) until 3.8 normal liters of oxygen calculated at normal temperature of 0° C. and normal pressure of 760 mm. Hg were taken up. The time required therefore was 11 minutes. Analysis revealed the total peracid quantity produced was 12.6 g. Only traces of per-adduct were formed. The quantity of acetic acid produced was 0.54 g. The peracetic acid yield based on the acetaldehyde converted therefore was 95% at an acetaldehyde conversion of 48.5%.

As a comparison the following tests (a) and (b) were carried out under the same conditions but until higher quantities of oxygen had been consumed to provide for a higher acetaldehyde conversion.

(a) In this test the oxidation was discontinued after 5.2 normal liters of oxygen had been taken up. This required 23 minutes but only 14.5 g. of peracetic acid were produced and 4.9 g. of acetic acid were also produced. The acetaldehyde conversion was 75% but the peracetic acid yield based on acetaldehyde converted was only 70%.

(b) In this test the oxidation was discontinued after 6 normal liters of oxygen had been taken up. This required 74 minutes but only 14.8 g. of peracetic acid were produced and 9 g. of acetic acid were produced in addition. The acetaldehyde conversion was 94% but the peracetic acid yield based on acetaldehyde converted was only 56.5%.

*Example 2*

A reaction mixture consisting of 24 g. of acetaldehyde and 170 cc. of ethyl acetate containing 0.0015 g. of cobalt nitrate as catalyst was oxidized at 30° C. in the same apparatus as in Example 1 and at atmospheric pressure. About 5.8 normal liters of oxygen were taken up in 9 minutes. The acetaldehyde conversion was 51%. 18.6 g. of peracetic acid and 2 g. of acetic acid were obtained. The yield of peracetic acid therefore was 88% based upon the acetaldehyde converted.

*Example 3*

A mixture of 31.6 g. of acetaldehyde and 150 cc. of acetone containing 0.0030 g. of cobalt chloride as catalyst was oxidized at 30° C. in a closed vessel with oxygen at 2 atmospheres gauge pressure for 6 minutes while shaking vigorously. During this period 20.2 g. of peracetic acid and 2.6 g. of acetic acid were produced. The acetaldehyde conversion was 43% and therefore the yield of peracetic acid on acetaldehyde converted was 86%. The quantity of oxygen taken up was 6.5 normal liters.

When the oxidation was continued until 70% of the acetaldehyde had been converted, 26 g. of peracetic acid and 9.6 g. of acetic acid were produced. Within 20 minutes 9.4 normal liters of oxygen were taken up. The yield of peracetic acid was 68% on the acetaldehyde converted.

*Example 4*

3020 g. of a solution of 820 g. of acetaldehyde and 2200 g. of ethyl acetate containing 0.041 g. of cobalt acetate as catalyst were treated per hour at 30° C. in a gas contacting apparatus of about 500 cc. capacity with molecular oxygen at 2 atmospheres gauge pressure. The treated solution which continuously flowed out was immediately cooled to 15° C. and 0.1% of Victor Stabilizer (dialkyl phosphoric acid ester and/or ethylene diamine tetra acetic acid) added thereto as stabilizer and supplied at an absolute pressure of 200 mm. Hg to the upper third of a fractionating column. The ethyl acetate vapors produced in the sump below the column drove off the acetaldehyde from the mixture supplied to the column and such acetaldehyde vapors were condensed together with ethyl acetate in a cooler connected to the top of the column and returned to the oxidation apparatus. The solution which was continuously withdrawn from the sump was passed through a layer of cation exchanger (Amberlite IR 120 (exchanger resins containing sulphonic acid groups)).

588 g. of peracetic acid in the form of a 30% solution in ethyl acetate were produced per hour and in addition 117 g. of acetic acid were produced per hour. The yield of peracetic acid was 80% upon the acetaldehyde converted (52%). The peroxygen losses occurring during the distillation are included in such yield.

We claim:

1. In a process for the production of peracetic acid by oxidation of acetaldehyde dissolved in an inert organic solvent with molecular oxygen in the presence of catalytic quantities of a heavy metal salt as catalyst at temperatures between 15 and 50° C., the steps of oxidizing such acetaldehyde solution with molecular oxygen only until about 50% of the acetaldehyde has been oxidized, then rendering the heavy metal salt in the thus oxidized solution substantially non-deleterious to the peracetic acid contained therein and immediately distilling off all of the acetaldehyde therefrom under subatmospheric pressure.

2. The process of claim 1 in which said oxidation is carried out at 20 to 35° C. and the concentration of acetaldehyde in such inert solvent is about 10 to 30%.

3. The process of claim 1 in which the heavy metal salt in such oxidized solution is rendered substantially non-deleterious by the addition of a stabilizer for such peracetic acid.

4. The process of claim 1 in which the heavy metal salt in such oxidized solution is rendered substantially non-deleterious by removal with a cation exchanger.

References Cited by the Examiner

UNITED STATES PATENTS

| 2,314,385 | 3/1943 | Bludworth | 260—502 |
| 2,804,473 | 8/1957 | Phillips et al. | 260—502 |
| 2,830,080 | 4/1958 | Stevens | 260—502 |

FOREIGN PATENTS

| 1,230,103 | 3/1960 | France. |
| | | (864,803 British equivalent) |
| 730,116 | 3/1943 | Germany. |

LORRAINE A. WEINBERGER, *Primary Examiner.*

LEON ZITVER, *Examiner.*